(No Model.)
A. FOGEL.
POP SAFETY VALVE.
No. 461,149. Patented Oct. 13, 1891.
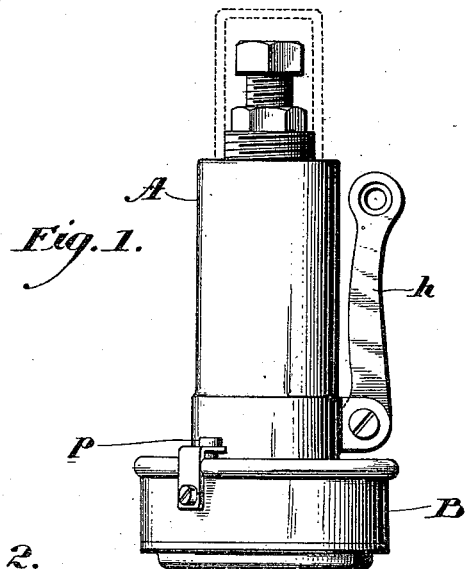
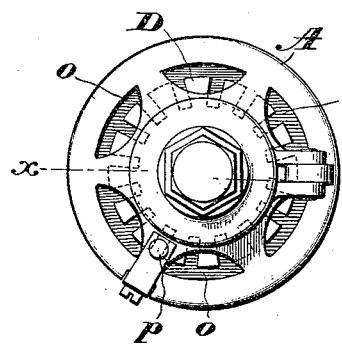
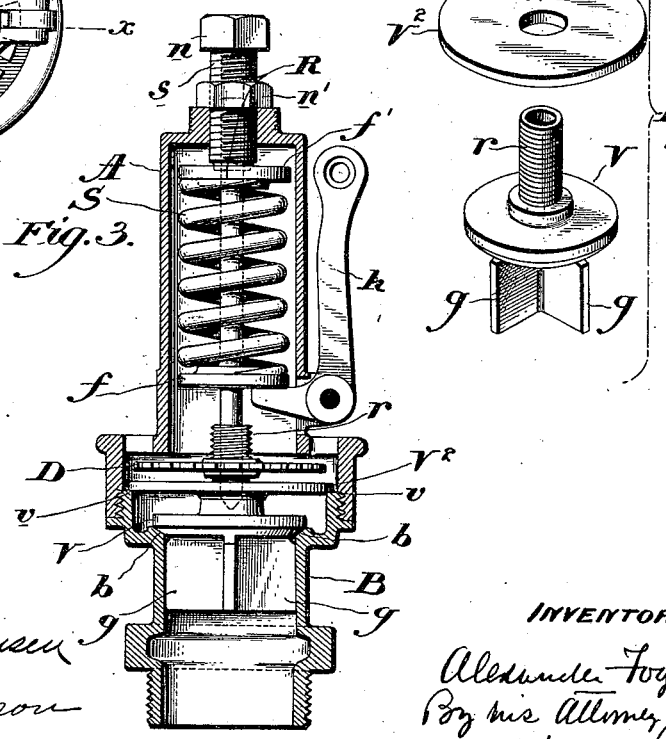
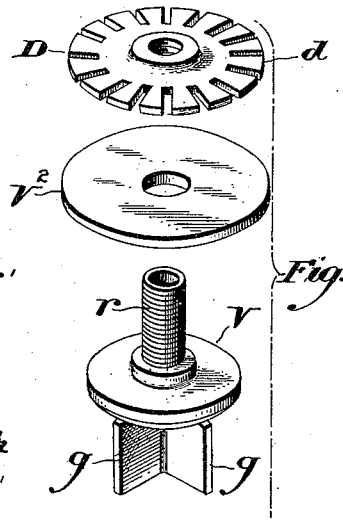
WITNESSES:
INVENTOR:
Alexander Fogel,
By his Attorney,
Horace Pettit

UNITED STATES PATENT OFFICE.

ALEXANDER FOGEL, OF PHILADELPHIA, PENNSYLVANIA.

POP SAFETY-VALVE.

SPECIFICATION forming part of Letters Patent No. 461,149, dated October 13, 1891.

Application filed July 23, 1891. Serial No. 400,417. (No model.)

*To all whom it may concern:*

Be it known that I, ALEXANDER FOGEL, of the city of Philadelphia and State of Pennsylvania, have invented a certain new and useful Improvement in Pop Safety-Valves; and I do hereby declare the following to be a full, clear, and exact description thereof, reference being had to the accompanying drawings, forming part of this specification.

My invention has relation to pop safety-valves for steam boilers, engines, &c.; and it consists in the improvements hereinafter particularly described.

The object of my invention is to provide a double-disk valve presenting two opposing surfaces to the steam-pressure, one rigid and the other adjustable, by which greater safety and nicety of regulation may be attained.

In the accompanying drawings, in which similar letters of reference refer to similar parts, I illustrate a construction of spring-operated pop safety-valve with my improved valve construction and parts therein provided.

Figure 1 is a side elevation of a pop safety-valve. Fig. 2 is a plan view. Fig. 3 is a longitudinal sectional view on the line $x\,x$ of Fig. 2. Fig. 4 is a detached perspective view of parts of the valve.

A represents the upper casing of the pop-valve, screwed or otherwise secured to the lower casing B of the valve. A vertical rod R is provided within the casing A, bearing at its lower end, preferably removably, upon the valve V. The upper end of the rod R is loosely fitted within a sleeve $s$, which is threaded on its exterior and provided with a nut $n$ for operation. The screw-threaded sleeve $s$ is screwed into the top of the casing A and preferably provided with a lock-nut $n'$. A spiral spring S is provided around the rod R within the casing A, bearing upon a flange $f$, which is rigidly secured to the rod R. A loose washer or flange $f'$ is provided above, between the top of the spring S and the end of the sleeve $s$. The valve V is provided on its under side with guides or wings $g$ for guiding it in position relatively to its seat. The tension of the spring S is regulated by the screw-threaded sleeve $s$, and thus retains the valve V compactly upon its seat $b$ until the pressure of steam overcomes the tension of the spring S.

In the construction of my improved valve I provide above the main-valve flange V an additional auxiliary loosely-fitted sliding valve flange or disk $V^2$. The relative position of each when operated upon by the steam is regulated by means of a disk D, adjustably secured to a screw-threaded sleeve $r$, which sleeve $r$ is rigidly secured at its lower end to the valve V, into which sleeve the lower end of the rod R is set, and upon which the valve $V^2$ is adjusted, adapted to slide between the top of the valve V and the disk D. The flange $V^2$, by the regulation of the disk D, is allowed a given vertical play between the main-valve flange V and the disk D. When the disk D is turned down approximately close to the valve-flange $V^2$, as the steam having attained an excess of pressure raises the valve V from its seat, the flange $V^2$ is then also forced by the steam impinging upon it, but only a slight distance above its seat $v$, as it is retained by the disk D, and the area for the exit for the steam being limited the escape is comparatively slight. Should, however, the disk D, be adjusted, by turning on the sleeve $r$, to a greater distance above the main valve V, allowing of considerable rise of the valve-flange $V^2$, as the steam lifts the main valve V, and then impinges upon the under surface of the valve $V^2$, the valve will be forced against the disk D to a greater distance than in the former position, and the area of the exit between the valve $V^2$ and its seat $v$ being materially increased the escape of steam will be much greater, though the tension of the spring S, regulated through the medium of a screw-threaded sleeve $s$, is the same in both instances. It will thus be seen that by the adjustment of the disk D the valve $V^2$ may be given any desired play, and the escape of steam regulated to a nicety, while the tension of the spring S may remain the same.

The disk D may be readily adjusted through the orifice $o$, provided in the top of the casing D. Any well-known means for rotating it may be employed. The disk D is preferably provided with teeth or projections $d$ to facilitate its adjustment and to hold it rigidly in any given position through the medium of a pin or projection $p$, inserted between the teeth $d$, as in the construction shown in Figs 1 and 2, though any well-known device may be employed for holding the disk in position. The lever $h$, adjusted under the flange $f$, is provided as a ready means for opening the valve at will by hand for testing or other purposes.

Having thus described my invention, what I desire to secure by Letters Patent is—

1. In a safety-valve, in combination with a casing, supporting parts, tension device, and main valve and seat, an auxiliary sliding valve and seat provided above the main valve, and regulating device regulating and governing its position, substantially as described.

2. In a safety-valve having casing and supporting parts and tension-regulating device, in combination with the main valve, an auxiliary sliding valve provided above the same, and regulating device for regulating the slide of the auxiliary valve, substantially as described.

3. In a safety spring-operated valve, casing, supporting parts, and tension-regulating device, in combination with the main valve, sliding valve adjusted above the main valve, and regulating-disk for regulating the extent of the slide of the auxiliary valve, substantially as described.

4. In a safety-valve, in combination with the casing and supporting parts, valve V, auxiliary valve $V^2$, regulating-disk D, vertical rod R, spring S, and tension-regulating device and parts, substantially as described.

5. In a safety-valve, casings A and B, vertical rod R, adjusted upon the main valve V, spring S, provided around the rod R, tension-regulating sleeve $s$, main valve V, auxiliary sliding valve $V^2$, and regulating-disk D, provided on the screw-threaded sleeve $r$, affixed to the main valve V, substantially as described.

6. In a safety-valve, casings A and B, rod R, spring S, provided on the flange $f$, regulating-sleeve $s$, hand-lever $h$, valve V, auxiliary sliding valve $V^2$, adjusted in their respective seats, regulating-disk D, having radiating teeth $d$, and securing device $p$ for holding the regulating-disk in position, substantially as described.

In witness whereof I have hereunto set my hand this 21st day of July, A. D. 1891.

ALEXANDER FOGEL.

Witnesses:
WM. A. PIKE,
HORACE PETTIT.